(12) United States Patent
Seddon et al.

(10) Patent No.: US 7,406,233 B2
(45) Date of Patent: Jul. 29, 2008

(54) FIBER OPTIC CABLE HAVING A DRY INSERT WITH A FOLD

(75) Inventors: David Alan Seddon, Hickory, NC (US); Anne G. Bringuier, Taylorsville, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/603,710

(22) Filed: Nov. 22, 2006

(65) Prior Publication Data

US 2008/0118211 A1    May 22, 2008

(51) Int. Cl.
*G02B 6/44* (2006.01)
(52) U.S. Cl. ........................ 385/114; 385/100
(58) Field of Classification Search ............. 385/114
See application file for complete search history.

(56) References Cited

U.S. PATENT DOCUMENTS

| | | | | |
|---|---|---|---|---|
| 4,097,119 A | | 6/1978 | Kumamaru et al. | 350/96.23 |
| 5,323,702 A | * | 6/1994 | Vrotacoe et al. | 101/217 |
| 5,668,912 A | * | 9/1997 | Keller | 385/100 |
| 6,970,629 B2 | * | 11/2005 | Lail et al. | 385/100 |
| 7,177,507 B2 | | 2/2007 | Parsons et al. | 385/100 |
| 7,236,670 B2 | | 6/2007 | Lail et al. | 385/100 |
| 7,254,302 B2 | | 8/2007 | Parsons et al. | 385/100 |
| 2004/0057681 A1 | | 3/2004 | Quinn et al. | 385/110 |
| 2004/0120662 A1 | * | 6/2004 | Lail et al. | 385/100 |
| 2004/0120663 A1 | * | 6/2004 | Lail et al. | 385/100 |
| 2004/0208462 A1 | * | 10/2004 | Parsons et al. | 385/100 |
| 2004/0223707 A1 | * | 11/2004 | Parsons et al. | 385/100 |
| 2004/0240806 A1 | | 12/2004 | Lail et al. | 385/100 |
| 2004/0240808 A1 | * | 12/2004 | Rhoney et al. | 385/100 |
| 2005/0013573 A1 | * | 1/2005 | Lochkovic et al. | 385/128 |
| 2005/0213902 A1 | * | 9/2005 | Parsons | 385/102 |
| 2006/0165355 A1 | | 7/2006 | Greenwood et al. | 385/100 |
| 2007/0025668 A1 | | 2/2007 | Greenwood et al. | 385/103 |
| 2007/0098339 A1 | | 5/2007 | Bringuier et al. | 385/106 |

* cited by examiner

*Primary Examiner*—M. R. Connelly-Cushwa
*Assistant Examiner*—Kajli Prince
(74) *Attorney, Agent, or Firm*—Michael E. Carroll, Jr.

(57) ABSTRACT

A fiber optic cable includes at least one optical waveguide, at least one dry insert and a cable jacket. The at least one optical waveguide and at least one dry insert are at least partially disposed within a cavity of the cable jacket. The at least one dry insert has a first and second portion that are connected to one another. In one embodiment, at least one fold is present between the two portions.

35 Claims, 10 Drawing Sheets

FIBER OPTIC CABLE HAVING A DRY INSERT WITH A FOLD

FIELD OF THE INVENTION

The present invention relates generally to dry packaging of optical waveguides. More specifically, the invention relates to optical assemblies for communication systems that include at least one dry insert for protecting at least one optical waveguide in a cavity.

BACKGROUND OF THE INVENTION

Fiber optic cables include optical waveguides such as optical fibers that transmit optical signals, for example, voice, video, and/or data information. One type of fiber optic cable configuration includes an optical waveguide disposed within a tube or cavity, thereby forming an assembly. Generally speaking, the tube protects the optical waveguide; however, the optical waveguide must be further protected within the tube. For instance, the optical waveguide should have some relative movement between the optical waveguide and the tube or cavity to accommodate bending. On the other hand, the optical waveguide should be adequately coupled with the tube or cavity, thereby inhibiting the optical waveguide from being displaced within the tube or cavity when, for example, pulling forces are applied to install the cable. Additionally, the tube assembly or cavity should inhibit the migration of water therein. Moreover, the fiber optic cable should be able to operate over a range of temperatures without undue optical performance degradation.

Conventional optical tube assemblies meet these requirements by filling the tube with a thixotropic material such as grease. Thixotropic materials generally allow for adequate movement between the optical waveguide and the tube, cushioning, and coupling of the optical waveguide. Additionally, thixotropic materials are effective for blocking the migration of water within the tube. However, the thixotropic material must be cleaned from the optical waveguide before connectorization of the same. Cleaning the thixotropic material from the optical waveguide is a messy and time-consuming process. Moreover, the viscosity of thixotropic materials is generally temperature dependent. Due to changing viscosity, the thixotropic materials can drip from an end of the fiber optic cable at relatively high temperatures and the thixotropic materials may cause optical attenuation at relatively low temperatures.

Cable designs have attempted to eliminate thixotropic materials, but the designs are generally inadequate because they do not meet all of the requirements and/or are expensive to manufacture. One example that eliminates the thixotropic material is U.S. Pat. No. 4,909,592, which discloses a tube having conventional water-swellable tapes and/or yarns disposed therein. For instance, conventional water-swellable tapes are typically formed from two thin non-woven layers that sandwich a water-swellable powder therebetween, thereby forming a relatively thin tape that does not fill the space inside a buffer tube. Consequently, conventional water-swellable tapes do not provide adequate coupling for the optical waveguides because of the unfilled space. Additionally, the space allows water within the tube to migrate along the tube, rather than be contained by the conventional water-swellable tape. Thus, this design requires a large number of water-swellable components within the tube for adequately coupling the optical fibers with the tube. Moreover, the use of large numbers of water-swellable components inside a buffer tube is not economical because it increases the manufacturing complexity along with the cost of the cable.

Another example that eliminates the thixotropic material from a fiber optic cable is U.S. Pat. No. 6,278,826, which discloses a foam having a moisture content greater than zero that is loaded with super-absorbent polymers. The moisture content of the foam is described as improving the flame-retardant characteristics of the foam. Likewise, the foam of this design is relatively expensive and increases the cost of the cable.

SUMMARY OF THE INVENTION

To achieve these and other advantages and in accordance with the purpose of the invention as embodied and broadly described herein, the invention is directed in one aspect to a fiber optic cable having at least one optical waveguide, a cable jacket having a cavity therein, at least one optical waveguide, and a dry insert. The at least one optical waveguide being at least partially disposed within the cavity along with the dry insert. The dry insert has a first portion and a second portion that are connected together with at least one fold portion therebetween. The at least one optical fiber is disposed between the first and second portions of the dry insert, thereby coupling the at least one optical waveguide to the cable jacket.

In another aspect, the invention is directed to a fiber optic cable having at least one optical waveguide, a cable jacket having a cavity therein, and a dry insert. The at least one optical waveguide is at least partially disposed within the cavity along with the dry insert. The dry insert has a first portion disposed adjacent a first cavity wall and a second portion disposed adjacent a second cavity wall that opposes the first cavity wall and the at least one optical fiber is disposed between the first and second portions of the dry insert. The first and second portions of the dry insert being connected to one another and having a fold therebetween.

In yet another aspect, the invention is directed to fiber optic cable that includes at least one optical fiber ribbon, a cable jacket having a cavity therein, and a dry insert. The at least one optical fiber ribbon is at least partially disposed within the cavity along with the dry insert. The dry insert has a first portion and a second portion, the first portion being connected to the second portion and the first and second portions being generally parallel to one another and having at least one fold portion therebetween. The at least one optical fiber is disposed between the first and second portions of the dry insert, thereby coupling the at least one optical waveguide to the cable jacket, wherein the dry insert includes a compressible layer and a water-swellable layer.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain principals and operations of the invention.

DETAILED DESCRIPTION OF THE INVENTION

Figure 1:
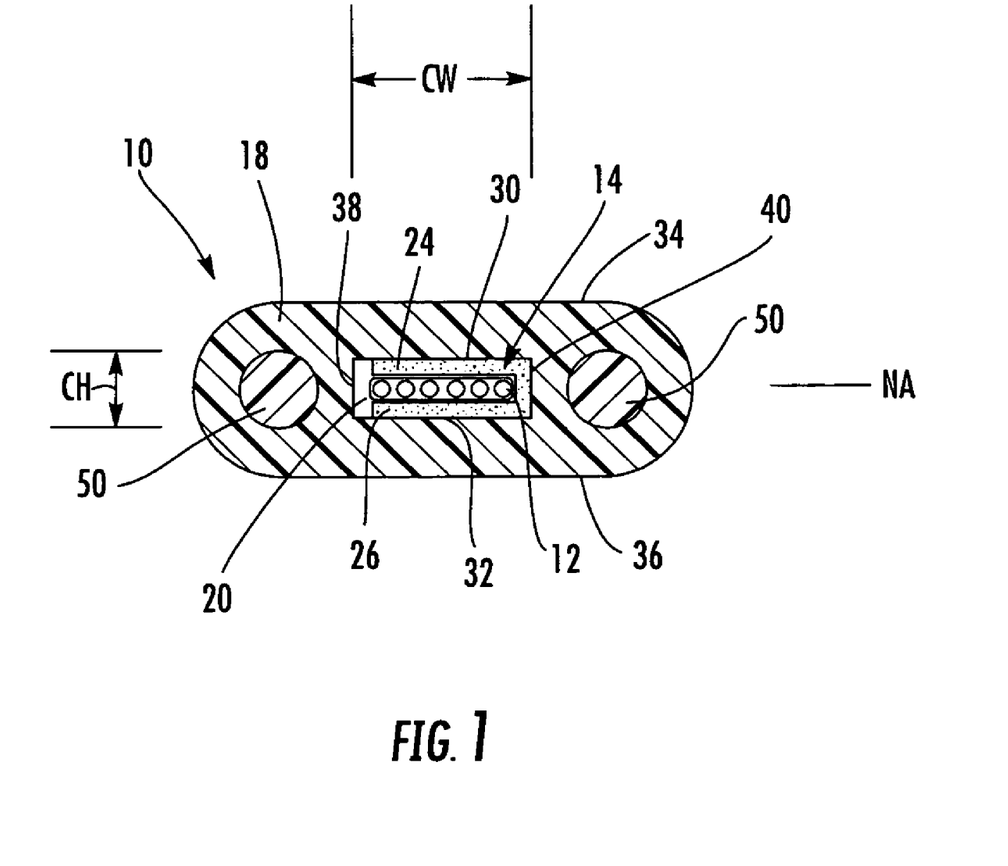
FIG. 1 is a cross-sectional view of a tubeless fiber optic cable according to the present invention.

Reference will now be made in detail to the present preferred embodiments of the invention, examples of which are illustrated in the accompanying drawings. Whenever practical, the same reference numerals will be used throughout the drawings to refer to the same or like parts. Illustrated in FIG. 1 is an exemplary fiber optic cable 10 according to one aspect of the present invention. Fiber optic cable 10 includes at least one optical waveguide 12 such as an optical fiber, a dry insert 14, and a cable jacket 18. The at least one optical waveguide 12 and the dry insert 14 are disposed in a cavity 20 in the fiber optic cable 10. In this case, the at least one optical waveguide 12 is a portion of a fiber optic ribbon. Fiber optic cable 10 includes one ribbon, but other variations may have a plurality of ribbons. Dry insert 14, which has at least a first portion 24 and a second portion 26, and is preferably disposed on three sides of the at least one optical waveguide 12. As discussed in more detail below, dry insert 14 has at least one fold disposed between first portion 24 and second portion 26 for accomplishing this arrangement. Dry insert 14 performs functions such as cushioning, coupling, inhibiting the migration of water, and accommodates bending of the fiber optic cable 10. Dry insert 14 is advantageous because the optical waveguides are easily removed from the fiber optic cable 10 without leaving a residue or film that requires cleaning before connectorization. Moreover, unlike conventional thixotropic materials, dry insert 14 does not change viscosity with temperature variations or have a propensity to drip from an end of the fiber optic cable at high temperatures.

Cavity 20 has a generally rectangular cross-section, but could have other suitable cross-sections such as oval, round, or the like. Cavity 20 preferably has two opposing internal major surfaces 30,32 that generally correspond with two opposing major surfaces 34,36 of cable jacket 18 and define a cavity width CW. Cavity 20 also preferably has two opposing internal minor surfaces 38,40, that define a cavity height CH. Dry insert 14 is disposed in cavity 20, with the first and second portions 24,26 at least partially against the internal major surfaces 30,32. In this way, optical waveguide 12 is located generally near a neutral axis NA of fiber optic cable 10. As noted below in more detail, dry insert 14 couples optical waveguides 12 to cable jacket 18.

Fiber optic cable 10 also preferably includes at least one strength member 50 for providing tensile strength and in this embodiment includes two strength members 50 disposed on opposite sides of cavity 20. Strength members 50 may be formed from any suitable materials such as dielectrics, conductors, composites or the like. By way of example, strength members in this embodiment are glass reinforced plastic (GRPs), thereby forming a dielectric cable.

As depicted, optical waveguide 12 of FIG. 1 is an optical fiber that forms a portion of an optical fiber ribbon. In this case, the optical waveguides 12 are preferably a plurality of single-mode optical fibers. Additionally, other types or configurations of optical waveguides can be used. For example, optical waveguide 12 can be multi-mode, pure-mode, erbium doped, polarization-maintaining fiber, bend-resistant optical fibers, other suitable types of optical waveguides, and/or combinations thereof. Moreover, optical waveguide 12 can be loose or in bundles. Each optical waveguide 12 may include a silica-based core that is operative to transmit optical signals and is surrounded by a silica-based cladding having a lower index of refraction than the core. Additionally, one or more coatings can be applied to optical waveguide 12. For example, a soft primary coating surrounds the cladding, and a relatively rigid secondary coating surrounds the primary coating. In one embodiment, one or more optical waveguides 12 include a coating system as disclosed in U.S. patent application Ser. No. 10/632,219 filed on Jul. 18, 2003, the disclosure of which is incorporated herein by reference. Optical waveguide 12 can also include an identifying means such as ink or other suitable indicia for identification. Of course, optical waveguide 12 can also include a tight buffer layer. Suitable optical fibers are commercially available from Corning Incorporated of Corning, N.Y.

Figure 2:
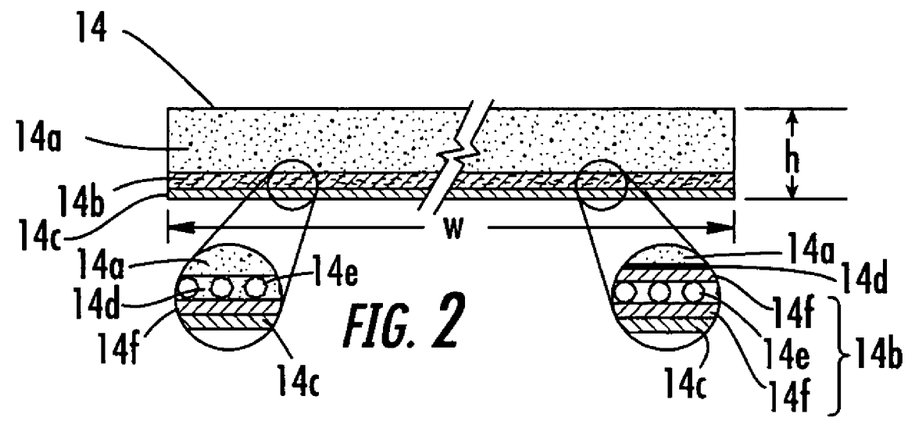
FIG. 2 is a cross-sectional view of the dry insert of a portion of the fiber optic cable of FIG. 1.

FIG. 2 illustrates a cross-sectional view of an explanatory dry insert 14. Dry insert 14 is formed from an elongate material or materials (i.e., an elongate tape) that are capable of being paid off from a reel for a continuous application during manufacture. Dry insert 14 can be formed from a plurality of layers that can perform different functions; however, the dry insert can be a single layer such as a felt material that is compressible and may optionally include a water-blocking/water-swellable feature. Dry insert 14 cushions optical waveguide 12 from cable jacket 18, thereby maintaining optical attenuation of optical waveguide 12 below about 0.4 dB/km at a reference wavelength of 1310 nm and 0.3 dB/km at a reference wavelengths of 1550 nm and 1625 nm. But other suitable optical attenuation values are possible such as 0.35/0.25 for the respective 1310 and 1550 reference wavelengths. In one embodiment, dry insert 14 is formed from two distinct layers. For instance, FIG. 2 depicts a first layer 14a of dry insert 14 that is a compressible layer and second layer 14b that is a water-swellable layer. In this case, first layer 14a is formed from a compressible material having a predetermined spring constant for providing adequate coupling characteristics. By way of example, the first layer is a foam tape such as an open cell foam tape; however, any suitable compressible material can be used such as a closed cell foam tape. As shown in FIG. 2, second layer 14b can have any suitable construction and in preferred embodiments is a suitable water-swellable tape having one or more components. For instance, water-swellable tapes can have different constructions as shown by the two different detail bubbles of FIG. 2, but generally include at least one tape such as a non-woven tape 14f having a plurality of water-swellable particles 14e. However, dry insert 14 can include other types of particles and/or compositions formed from one or more materials.

First layer 14a and second layer 14b are preferably attached together with an adhesive 14d so that a suitable force is required to separate the layers. For instance, adhesive 14d can be sprayed onto one or both of the layers during manufacture, thereby creating a fine mist that inhibits clusters of adhesive from forming; however, other suitable application methods are also possible. But, the adhesive may have other forms such as a powder that is applied to one or more layers. Whatever the form of adhesive used, it should not cause elevated levels of attenuation when the dry insert is placed about the optical waveguide. Likewise, water-swellable particles or conglomerate particles such as adhesive and/or water-swellable particles should not cause microbending. In other words, the average particle size of adhesive 14*d*, or other conglomerate materials such as adhesive and water-swellable powder, should be relatively small such as 600 microns or less, preferably about 450 microns or less, and most preferably about 300 microns or less so that if the particles press against the optical waveguide through a portion of dry insert 14 they will not cause elevated levels of microbending. As used herein, average particle size refers to particles of one or more materials used in dry insert 14.

As shown in the right detail bubble of FIG. 2, second layer 14*b* is a water-swellable tape having water-swellable particles 14*e* disposed between two non-woven tape-like materials 14*f* that is attached by adhesive 14*d* to first layer 14*a*. This construction inhibits particles from causing microbending since there is a non-woven tape that acts as a buffer between first layer 14*a* and water-swellable particles 14*e*. The average particle size of the water-swellable powder should be relatively small such as 600 microns or less, preferably about 450 microns or less, and most preferably about 300 microns or less so that if the water-swellable particles press against the optical waveguide through a portion of dry insert 14 they will not cause elevated levels of microbending. Second layer 14*b* can also have other constructions such as shown in the left detail bubble of FIG. 2. Specifically, this detail bubble shows water-swellable particles 14*e* attached to one side of a single non-woven tape 14*f*, which is then attached to compressible first layer 14*a* so that water-swellable particles 14*e* are disposed therebetween without a non-woven tape buffer layer. In this construction, adhesive 14*f* functions to attach water-swellable particles 14*e* and to attach the first and second layers 14*a*,14*b* of dry insert 14 together. However, this construction of dry insert 14 generally leads to a larger average particle size of a conglomerate material formed of adhesive and water-swellable particles. In other words, all things being equal the average particle size in this dry insert construction is generally larger because it creates a conglomerate particle compared with the water-swellable particle alone. Consequently, this may cause elevated microbending if the average particle size becomes too large. So in this construction the average particle size of the conglomerate or composite particle should be in the same range as stated above for inhibiting microbending.

Likewise, the inner surface of dry insert 14 should not cause elevated levels of microbending. Thus, in preferred embodiments, a surface of the layer that can contact the optical waveguides should have a relatively smooth surface. For instance, if foam is used as first layer 14*a* of dry insert 14 an average cell size of the foam is about 1000 microns or less, and can be about 700 microns or less, thereby creating a relatively smooth surface. Additionally, the foam may have layers with different size cells such as larger cells away from the optical waveguides and smaller cells near the surface of the foam that can contact the optical waveguides. Other variations include a surface treatment for smoothing the surface of the foam layer. Surface treatments include heating to smooth out the surface or filling the cells with a suitable material. Additionally, first layer 14*a* such as foam cushions the water-swellable particles and/or adhesive of dry insert 14 from causing microbending.

In one embodiment, the first layer of dry insert 14 is an open cell polyurethane (PU) foam tape. The PU foam tape may either be an ether-based PU or an ester-based PU, but other suitable foam tape compressible layers can be used such as a polyethylene foam, a polypropylene foam, or EVA foam. However, preferred embodiments use an ether-based foam tape since it performs better than an ester-based PU foam when subject to moisture. In other words, the ester-based PU foam can break down with moisture, whereas the ether-based PU foam is generally more robust with respect to moisture. Additionally, the foam layer has a predetermined density generally in the range of about 1 lb/ft$^3$ to about 3 lb/ft$^3$. Dry insert 14 also has a predetermined ultimate tensile strength to inhibit breakage during manufacture. Generally speaking, with dry inserts having both a compressible layer and a water-swellable layer the majority of the tensile strength is provided by the water-swellable layer(s). The ultimate tensile strength of the dry insert is preferably about 5 Newtons per centimeter width W of dry insert 14 or greater.

Dry insert 14 may have a water-swell speed so that the majority of swell height of the water-swellable substance occurs within about 120 seconds or less of being exposed to water, more preferably about 90 seconds or less. By way of example, dry insert 14 may have a maximum swell height of about 18 mm for distilled water and about 8 mm for a 5% ionic water solution i.e., salt water in a unrestricted swell state; however, dry inserts with other suitable maximum swell heights may be used. Tube assemblies may be constructed with a water-swell ratio of about 3 or more, about 5 or more, and up to about 7 or more. Water-swell ratio is defined as the unrestricted cross-sectional swell state area of the dry insert divided by the free space in the tube assembly. For round cables, the free space of the tube assembly is defined as an area of an inner diameter of the tube minus the area that the optical waveguides occupy. For instance, if the dry insert has an unrestricted cross-sectional swell state area of 50 mm$^2$ and the tube has a free space of 10 mm$^2$ the water-swell ratio is five. Dry insert 14 preferably has an uncompressed height h of about 5 mm or less for minimizing cable size such as the tube diameter, cable diameter, and/or cable height; however, any suitable height h can be used for dry insert 14. Additionally, height h of dry insert 14 need not be constant across the width, but can vary, thereby conforming to the cross-sectional shape of the optical waveguides and providing improved cushioning to improve optical performance.

Dry insert 14 may be compressed during assembly so that it provides a predetermined normal force that inhibits optical waveguide 12 from being easily displaced longitudinally along cable jacket 18. In other embodiments, first layer 14*a* of dry insert 14 is uncompressed in fiber optic cable 10, but begins to compress if optical waveguide movement is initiated. In further embodiments, the excess fiber length can aid in providing coupling since it causes undulations in the optical waveguides that create a local compression of dry insert 14. Other variations include attaching or bonding a portion of dry insert 14 to cable jacket 18. For example, adhesives, glues, elastomers, and/or polymers 14*c* are disposed on a portion of the surface of dry insert 14 that contacts cable jacket 18 for attaching dry insert 14 to cable jacket 18. For instance, layer 14*c* is a polymer layer that at least partially melts during the extrusion of cable jacket 18, thereby creating a bond therebetween and increasing the force needed to pull out the optical fibers.

No matter the construction and/or materials of the dry insert it should provide a suitable level of coupling of the optical waveguides to the cable jacket. Additionally, in order to quantify the amount of coupling for the optical waveguides a relatively long length of fiber optic cable is required. By way of example, optical fibers of cables according to the present invention have a coupling force of at least about 0.1625 Newtons per optical fiber for a thirty-meter length of fiber optic cable. Illustratively, a fiber optic cable having a single ribbon with ten optical fibers in the ribbon should have a coupling force of about 1.95 Newtons or greater for a thirty-meter length of fiber optic cable. Likewise, a similar fiber optic cable having a single optical fiber ribbon with six optical fibers should have a coupling force of about 0.975 Newtons or greater for a thirty-meter length of fiber optic cable. Measurement of the coupling force is accomplished by taking a thirty-meter fiber optic cable sample and pulling on a first end of the optical fibers (or fiber optic ribbon(s)) and measuring the force required to cause movement of the second end of the optical fiber(s) (or fiber optic ribbon(s)). In other words, the EFL (or ERL) must be straightened so that the coupling force is the amount of force required to move the entire length of optical fibers within the thirty-meter fiber optic cable sample.

Figure 3:
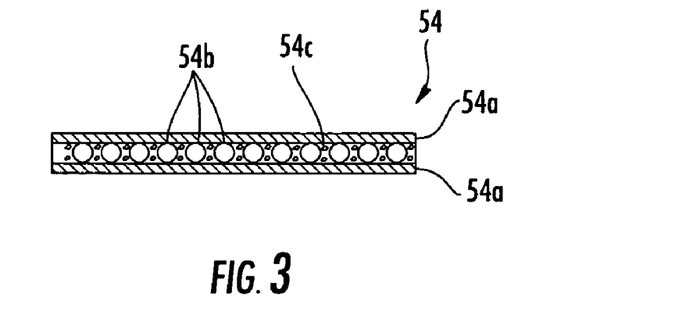
FIGS. 3-6 are cross-sectional views of alternative configurations of dry inserts according to the present invention.

Dry inserts of the present invention can use other suitable materials and/or constructions while still providing cushioning, coupling, and/or allowing movement of the optical fibers. Moreover, like the other dry inserts the water-swellable layer is optional and can use any suitable material(s)/construction (s). FIG. 3 depicts one example of another dry insert 54. Dry insert 54 includes a compressible layer formed from a plurality of microspheres 54b disposed between a top tape 54a and bottom tape 54a. As with other tapes, tapes 54a can be formed from any suitable material such as a non-woven material, Mylar, or other like materials. More specifically, microspheres 54b are generally disposed between tapes 54a and are attached using a suitable method such as an adhesive, bonding agent, application of heat and/or pressure, or the like. Additionally, an optional water-swellable substance such as a plurality of water-swellable particles or water-swellable coating 54c may also be disposed between tapes 54a with microspheres 54b or on a portion one or more tapes 54a. Suitable materials for microspheres 54b are relatively soft so they are compressible and sized so that they will not cause undue levels of optical attenuation if they press against the optical waveguide or optical fiber ribbon. By way of example, suitable hollow microspheres are available from Akzo Nobel of the Netherlands under the trade name EXPANCEL® and includes copolymers of monomers vinylidine chloride, acrylonitrile, and methylmethacrylate. Other plastic hollow microspheres are available from Asia Pacific Microspheres of Malaysia under the tradename of PHENOSET®, which are phenolic and amino-based microspheres.

The compressible nature of hollow polymeric microspheres is suited for providing adequate coupling of the optical fibers to the cable jacket or tube. Additionally, the smooth round surface of these microspheres permits pressing against the optical fibers without inducing elevated levels of optical attenuation such as during bending, twisting, or crushing of the optical fiber cable. Additionally, the size of the hollow microspheres can vary from about 1 micron to about 300 microns, likewise, a wall thickness of the microspheres can also vary from about 0.1 micron up to several microns, but other suitable dimensions are possible as long as a suitable level of optical performance is maintained.

Figure 4:
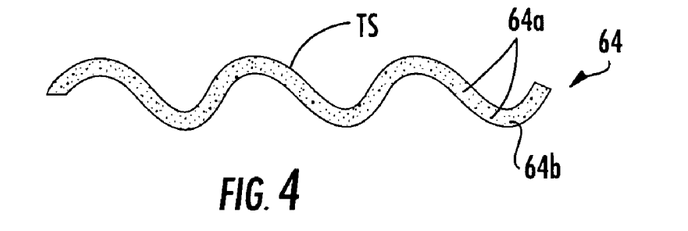

FIG. 4 depicts another example of a dry insert 64 that provides a compressible layer 64b using the geometry of its shape. More specifically, compressible layer 64b is provided by using a dimensional fabric 64a that has a generally textured shape TS in one or more directions for providing the compressible layer. As shown, dry insert 64 includes textured shape TS and is formed from a suitably soft and flexible material so that it can deform for providing an adequate level of coupling for the optical fibers or ribbons without causing undue levels of optical attenuation. By way of example, suitable fabrics are available from Freudenberg of Durham, N.C. under the name of Novolon. The dimensional fabrics may be formed from a variety of materials such as polyester, polypropylene, nylon, or other suitable materials. Generally speaking, dimensional fabrics are formed using a molding process for transforming a two-dimensional (i.e., flat) fabric or substrate into a three-dimensional (i.e., textured shape) fabric or substrate with the desired textured shape TS. The coupling and/or compressibility of dry insert 64 can be tailored by changing parameters such as the number of contact points per surface area (i.e., changing the density of high and low contact points), the height from a high point to a low point, the dimension fabric profile, and/or flexibility of the dimensional fabric. Again, dry insert 64 can include an optional water-swellable layer for blocking the migration of water along the cable or tube assembly. For instance, the water-swellable layer may be a coating applied to one or more surfaces or applied to the fibers of the dimensional fabric, include water-swellable particles disposed in or on the dry insert, and/or may include superabsorbent fibers. Suitable water-swellable filaments are, for example, LANSEAL® materials available from Toyobo of Osaka, Japan or OASIS® materials available from Technical Absorbents Ltd. of South Humberside, United Kingdom.

Figure 5:
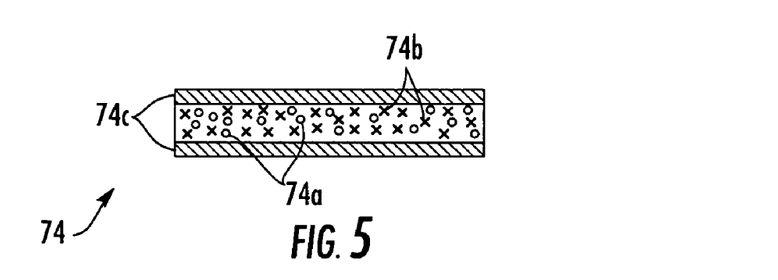

FIG. 5 depicts a further embodiment of a dry insert 74 having a compressible layer 74b having a non-woven layer of felt substance made of one or more materials formed from non-continuous and/or continuous filaments. Dry insert 74 may optionally include a water-swellable layer and/or one or more tapes for attaching the felt substance thereto. For instance, dry insert 74 includes a plurality of water-swellable filaments 74a along with other filaments 74b that are non-swellable disposed between a plurality of optional tapes 74c, thereby forming dry insert 74, As used herein, felt substance means a material comprising one or more types of non-continuous or continuous filaments and/or fibers which have been caused to adhere and/or matt together through the action of heat, moisture, chemicals, pressure, or mechanical action such as needle-punching or spun-lacing, or a combination of the foregoing actions, thereby forming a relatively thick and compressible layer. Water-swellable filaments 74a may comprise any suitable water-swellable material. By way of example, dry insert 74 of FIG. 5 may include about 25% or less by weight of water-swellable filaments 74a and about 75% or more by weight of other filaments 74b; however, other suitable ratios are possible. Other filaments 74b may include any suitable filament and/or fiber material such as polymer filaments like polypropylene, polyethylene, and polyesters, likewise, other suitable materials such as cottons, nylon, rayons, elastomers, fiberglass, aramids, polymers, rubber-based urethanes, composite materials and/or blends thereof may be included as a portion of other filaments 74b and may be tailored for providing specific characteristics.

Figure 6:
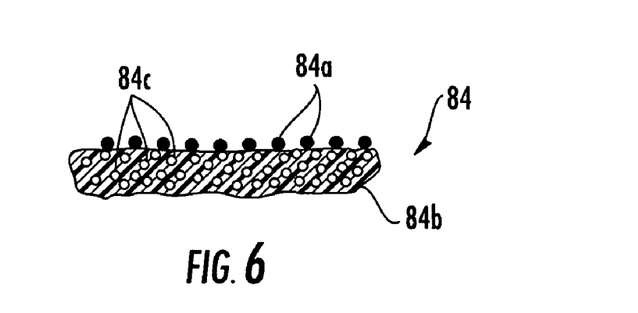

FIG. 6 depicts yet another dry insert 84 shaped as a generally flat tape having a compressible layer with a suitable width. By way of example, dry insert 84 is made of a plurality of filaments 84c such as a plurality of generally continuous polyester filaments grouped together by a compressible layer 84b that acts as a matrix material, but the use of other filament materials is possible. Compressible layer 84b is formed by, for instance, foaming the matrix material. Additionally the matrix material is used for attaching a plurality of water-swellable particles to dry insert 84 for forming a water-swellable layer 84a. Suitable foamed matrix materials include vinyls, polyurethanes, polypropylenes, EVAs, or polyethylene blends. The plurality of filaments and the matrix material are run through a die that forms dry insert 84 into its desired shape such as a generally flat ribbon-like profile. Dry inserts 84 may be run parallel to the fiber ribbons in a single layer or sandwich configuration or have other configurations such as helically wrapped about the optical fibers or ribbon stack. Other similar constructions are possible using any suitable materials for providing the compressible layer 84b and the water-swellable layer 84a. Dry insert can include still other constructions and/or materials such as sponge-like materials for a compressible layer such as polyvinylalcohol (PVA). Further, dry inserts can include other suitable materials and/or layers for other purposes such as a flame-retardant material and/or layer.

Additionally, ribbon embodiments of the present invention may have a positive excess ribbon length (ERL), although a negative ERL may be possible with some cable designs, but generally speaking performance may be affected. As used herein, ERL is defined as the length of the particular ribbon minus the length of the tube or cable containing the ribbon divided by the length of the tube or cable containing the ribbon, which can be expressed as a percentage by multiplying by 100. Whether the ERL is calculated using the tube length or the cable length depends on the particular configuration. Moreover, individual ribbons of a cable can have different values of ERL. By way of example, fiber optic cables generally have a positive ERL, such as a positive ERL in the range of about 0.0% to about 0.8% or greater, but other suitable values may be possible. Likewise, embodiments having loose or bundled optical fibers may include a positive excess fiber length (EFL) within a suitable range for the cable configuration.

Figure 7:
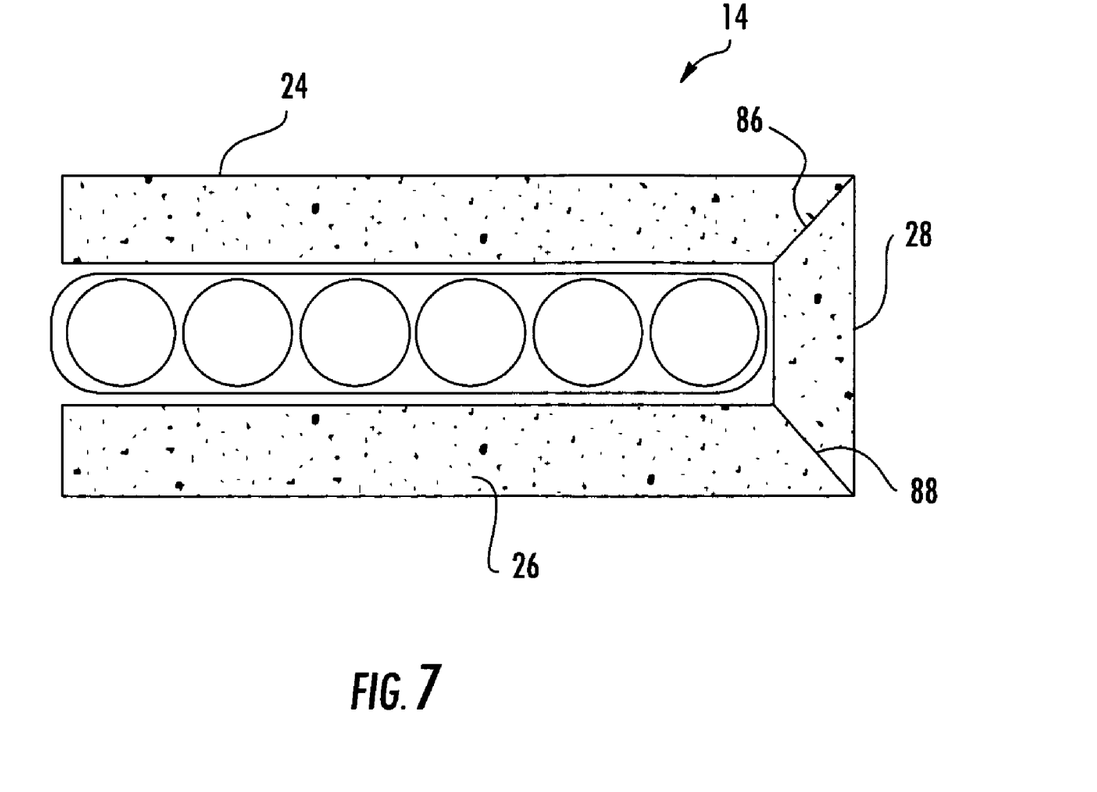
FIG. 7 is a cross-sectional view of another dry insert and optical fibers according to the present invention.

Dry insert 14 and optical fibers 12 from fiber optic cable 10 in FIG. 1 are illustrated in FIG. 7. In this embodiment, first portion 24 and second portion 26 are connected by a third portion 28 of dry insert 14. As shown, dry insert 14 is a single, unitary insert that has been folded twice, along two folds 86,88, thereby giving dry insert 14 a generally U-shaped cross sectional configuration. In this configuration, first portion 24 and second portion 26 are generally planar and parallel to one another. As used herein, fold means a discontinuity (or sharp break) in the surfaces of the dry insert and that the dry inserts are not simply rounded or gently manipulated (i.e., curved) to change direction for being placed about the optical fibers. Simply stated, each of the dry inserts has at least one fold, causing a discontinuity in the surfaces of the dry inserts.

Figure 8:
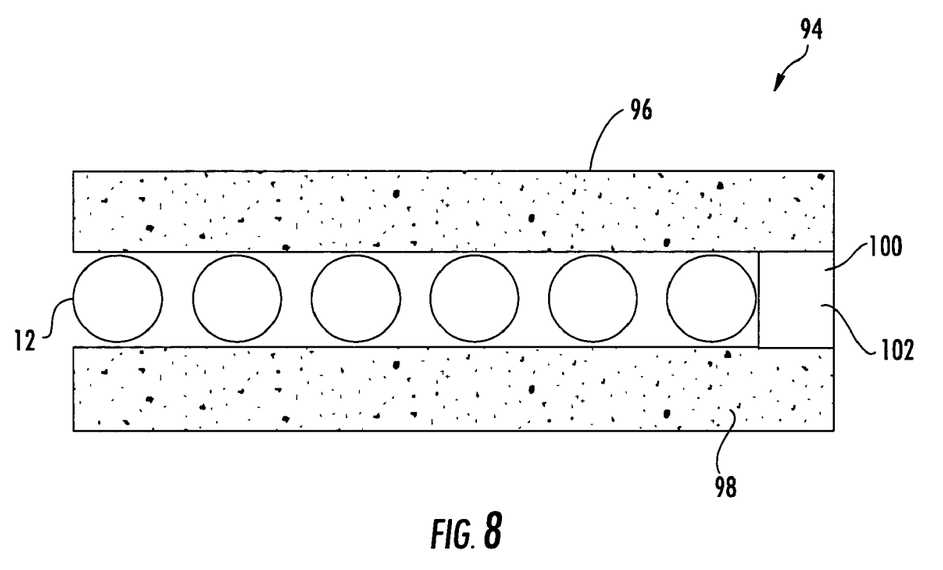
FIG. 8 is a cross-sectional view of another dry insert and optical fibers according to the present invention.
Figure 9:
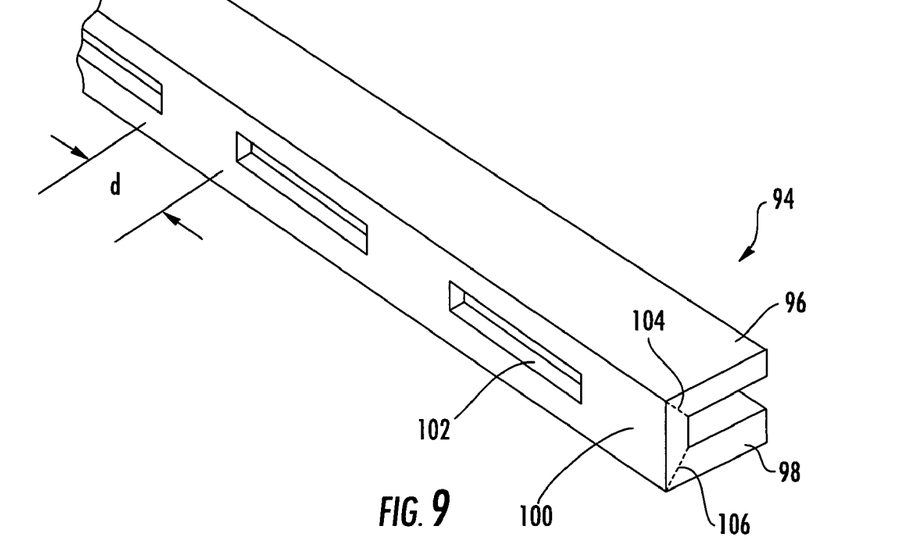
FIG. 9 is a front perspective view of the dry insert of FIG. 8.
Figure 9A:
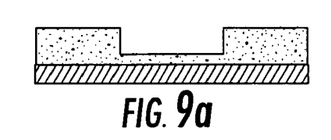

Another configuration of a dry insert 94 is illustrated in FIGS. 8 and 9. The dry insert 94 may be manufactured according to any of the embodiments discussed above with respect to FIGS. 2-6, or any other appropriate composition. Dry insert 94 is a single, unitary insert that has a first portion 96 and second portion 98 that are joined by a third portion 100. Third portion of dry insert 94 is intermittent along the length of the dry insert 94, providing a plurality of openings 102 between first portion 96 and second portion 98. Providing openings 102 inhibits mechanical forces from being applied to the optical waveguides closest to the openings, thereby preserving optical performance. Openings 102 may be longer or shorter than illustrated in FIG. 9, and preferably are equally spaced along dry insert 94 by a distance d. A length of openings 102 is preferably much longer than a length of third portions 100. For instance, a ratio of opening length to third portion length is about 10:1, but other suitable ratios are possible such as 20:1. The openings 102 may be formed in dry insert 94 during the manufacturing process or formed after manufacturing but before the dry insert 94 is used with a fiber optic cable. By way of example, the third portion of the dry insert is flattened by passing it through a roller and applying heat and/or pressure and then die cutting out the openings by running the third portion through another set of rollers. Thereafter, the dry insert 94 is folded twice, once along each of the two fold lines 104,106 to give the dry insert 94 a U-shaped configuration with first portion 24 and second portion 26 in a planar and parallel relationship to one another.

Figure 10:
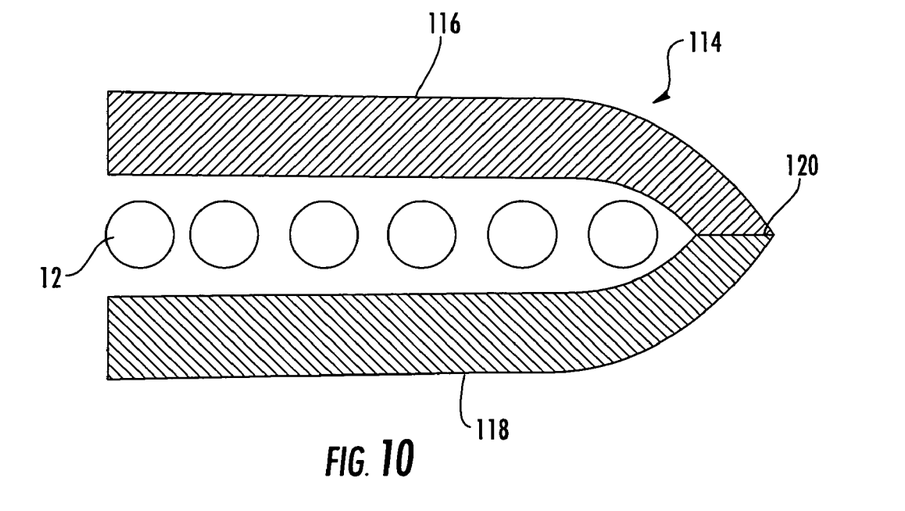
FIGS. 10 and 11 are cross-sectional views of dry inserts and optical fibers according to the present invention.

Another configuration of a dry insert 114 is illustrated in FIG. 10. As with the previous embodiment, the dry insert 114 may be manufactured according to any of the above embodiments with respect to FIGS. 2-6 or any other appropriate composition. In this embodiment, dry insert 114 is a single, unitary insert that has a first portion 116 and the second portion 118 that are folded along line 120 that is generally shaped as a "V". First portion 116 and second portion 118 (i.e., the portions distanced from the fold) are generally planar and parallel to one another, particularly at the edges away from the fold line 120.

Figure 11:
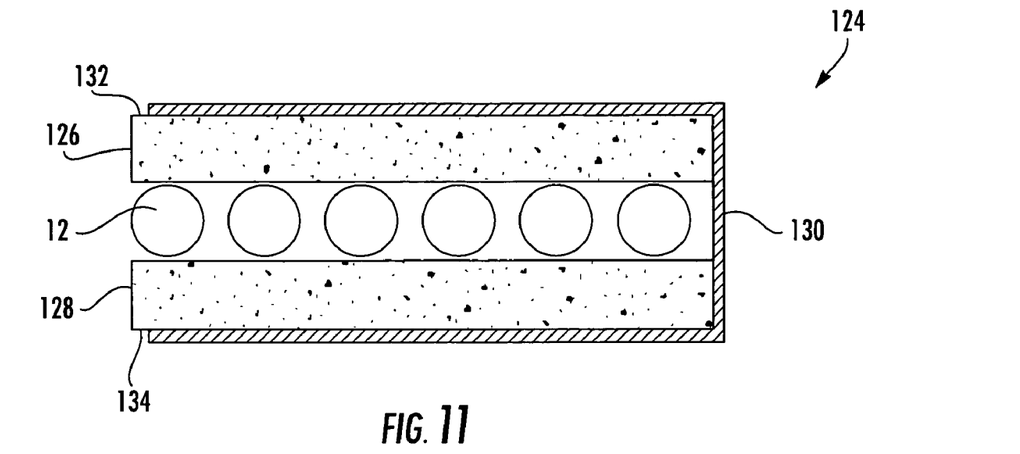

Another embodiment of a dry insert 124 is illustrated in FIG. 11. Dry insert 124 may be manufactured according to any of the above embodiments with respect to FIGS. 2-6 or any other appropriate composition. In this embodiment, dry insert 124 has a first portion 126 and the second portion 128 that are connected to one another by an adhesive member 130, which is illustrated as being a thin tape. Any appropriate connecting member may be used, including, for example, a stranded tape, mylar tape, paper tape, or the like. Adhesive member 130 is secured to a top surface 132 of first portion 126 and the bottom surface 134 of second portion 128 (as viewed in FIG. 11). Adhesive member 130 is also attached to the side surfaces of first and second portions 126,128, causing the adhesive member to have a fold at each of the corners of dry insert 124. This configuration allows first portion 126 and second portion 128 of dry insert 124 to be planar and parallel to one another across the entire width of the dry insert 124. While the adhesive member 130 is illustrated as extending across substantially all of the width of first and second portions 126,128, it need not. Rather adhesive member 130 could extend across only a portion of the width of first and second portions 126,128. Adhesive member 130 also need not extend the length of dry insert 124, but rather could be disposed intermittently along the length.

Figure 12:
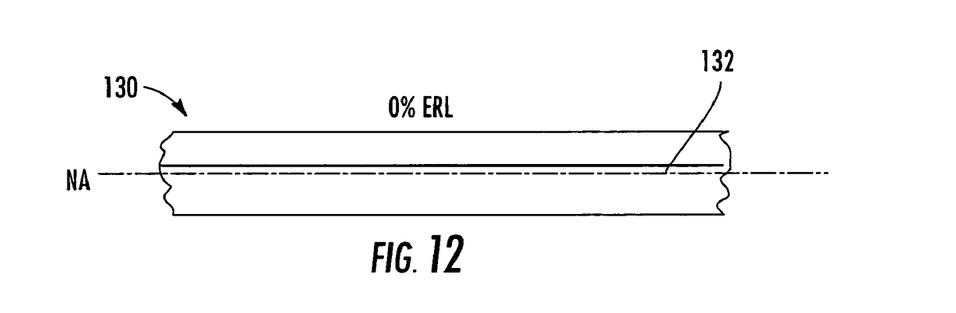
FIGS. 12 and 13 are schematic representations respectively depicting cable with zero excess ribbon length (ERL) and positive ERL.
Figure 13:
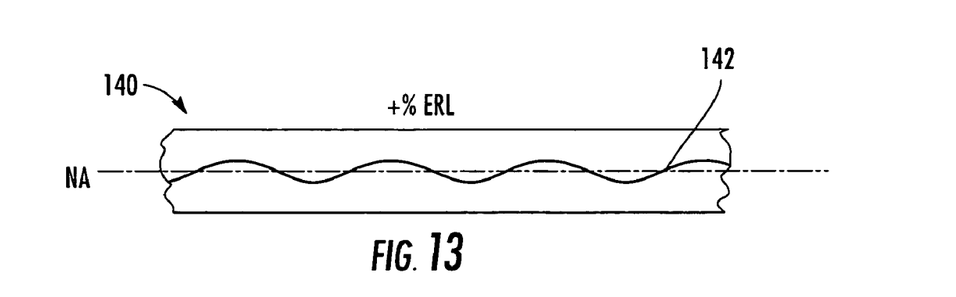

FIGS. 12 and 13 are schematic representations respectively showing the ribbon stacks of two different cables 130,140 laid out in a straight configuration and which generally represent the arrangement of a fiber optic ribbon in a cable according to the present invention. A neutral axis NA of cables 130,140 is represented by the dashed line NA. More specifically, FIG. 12 represents cable 130 with a fiber optic ribbon 132 having zero ERL and FIG. 13 represents cable 140 with a fiber optic ribbon 142 having a positive ERL. As shown, fiber optic ribbon 132 (no ERL) is generally straight within cable 130 along the neutral axis NA and fiber optic ribbon 142 (positive ERL) has a generally undulating profile about the neutral axis NA to accommodate the ERL. When cables 130,140 are bent the ribbons reposition within the cable to accommodate length changes in the cavity due to bending (i.e. the upper surface of the cavity lengthens and the bottom surface of the cavity is shorter).

Figure 14:
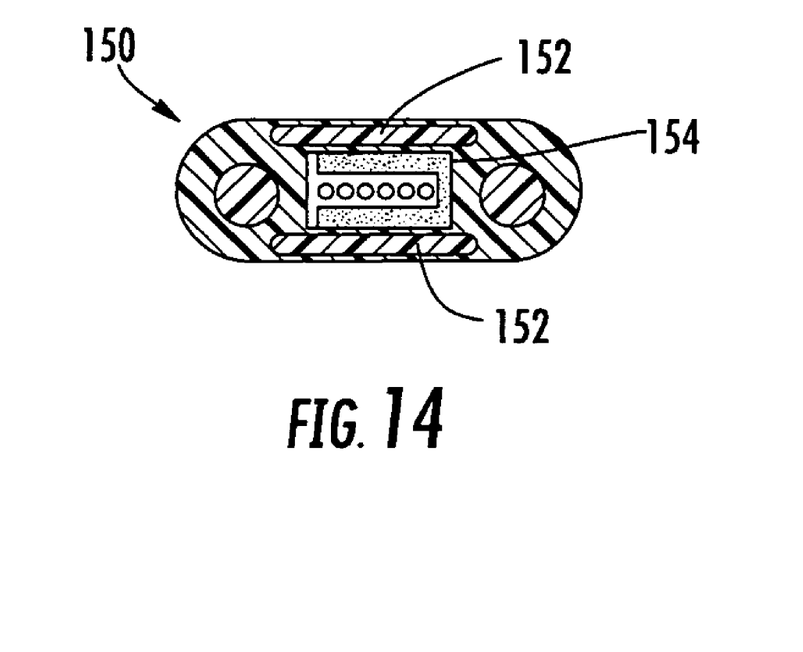
FIGS. 14-18 are cross-sectional views of other fiber optic cables according to the present invention.
Figure 15:
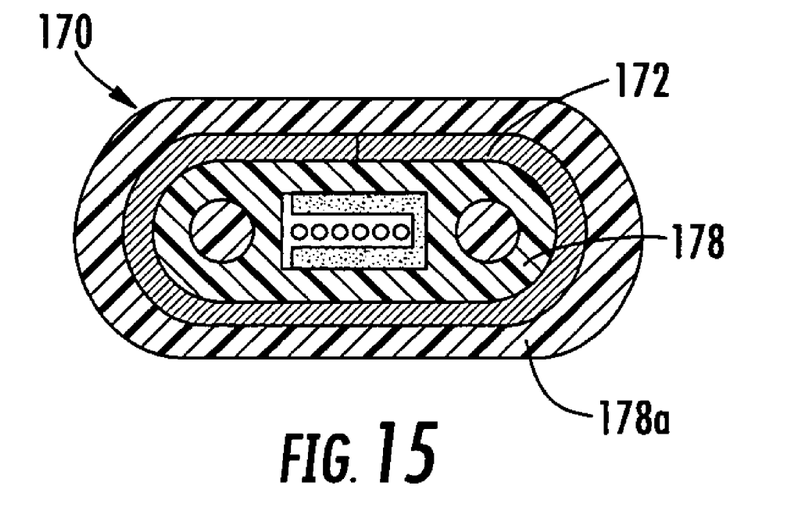

FIG. 14 depicts fiber optic cable 150 that is similar to fiber optic cable 10, but it further includes at least one armor layer 152 and in this embodiment two armor layers 152. Armor layers 152 are respectively positioned above and below the cavity 154 for inhibiting unintended breaches such as from rodents or point crushing contacts. Armor layer 152 can be formed from any suitable material such as a conductive material such as steel or a dielectric such as polyamide, polycarbonate, or a braided fabric formed from fiberglass, aramid or the like. FIG. 15 depicts another cable 170 that includes at least one armor layer 172. Fiber optic cable 170 is also similar to fiber optic cable 10, but has armor layer 172 wrapped about a cable jacket 178 and is further upjacketed with a second jacket 178a, thereby covering armor layer 172.

Figure 16:
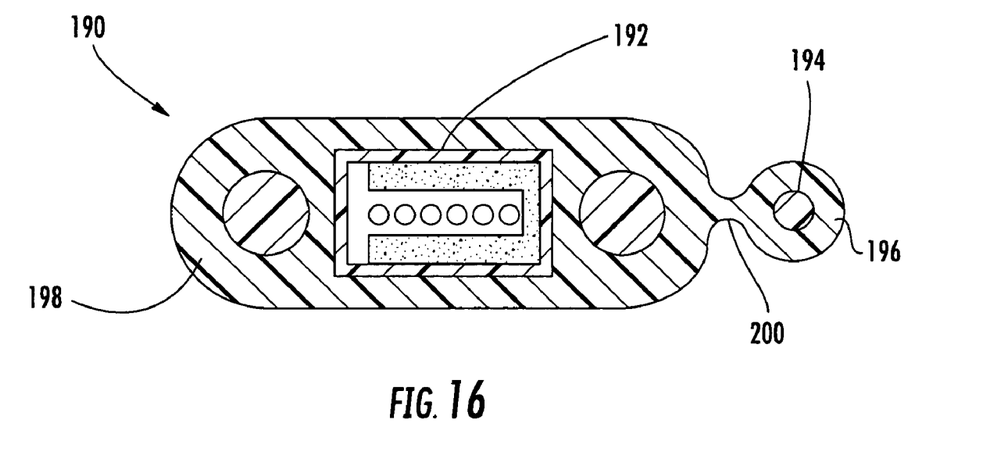

FIG. 16 depicts fiber optic cable 190 that is similar to fiber optic cable 10, but it further includes a tube 192 for protecting the optical fibers. Tube 192 can be formed from any suitable material and further protects the optical fibers of the fiber optic cable. Tube 192 may be formed in a separate extrusion process or as a co-extrusion with a cable jacket 198. Tube 192, along with cable jackets, may be formed from any suitable material such as a polymer. By way of example, one embodiment has a tube formed of HDPE and cable jacket is formed from a MDPE, but any suitable combination of materials may be used. Likewise, flame retardant materials may be used, thereby making the cables suitable for indoor applications. Additionally, fiber optic cable 190 further includes a toning lobe 196 having a toning wire 194 useful for locating the cable in buried applications. Toning lobe 196 is connected to cable jacket 198 by a web 200, thereby allowing toning lobe 196 to be separated from the main fiber optic cable body. Additionally, fiber optic cables without a toning lobe may have the capability of being tonable by using one or more cable components that are conductive. Furthermore, fiber optic cables can conduct electrical power if one or more of the fiber optic cable components are conductive such as including a twisted pair of copper wires or using conductive strength members.

Figure 17:
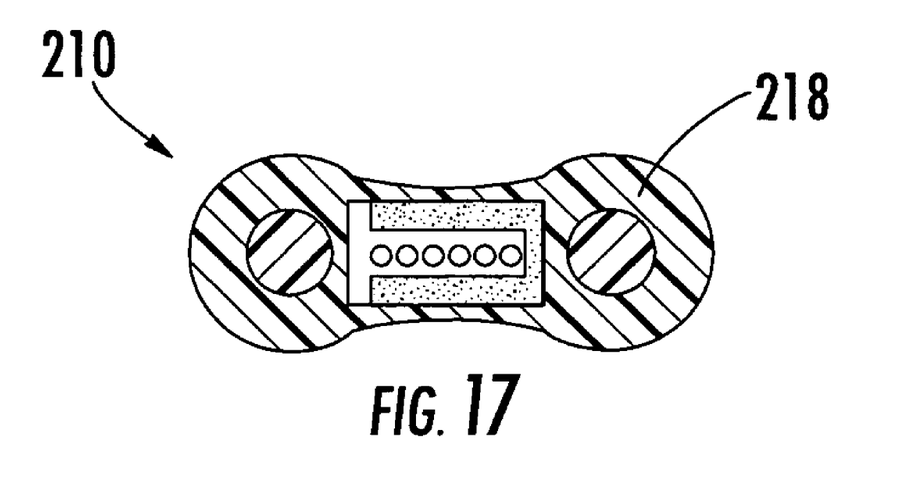
Figure 18:
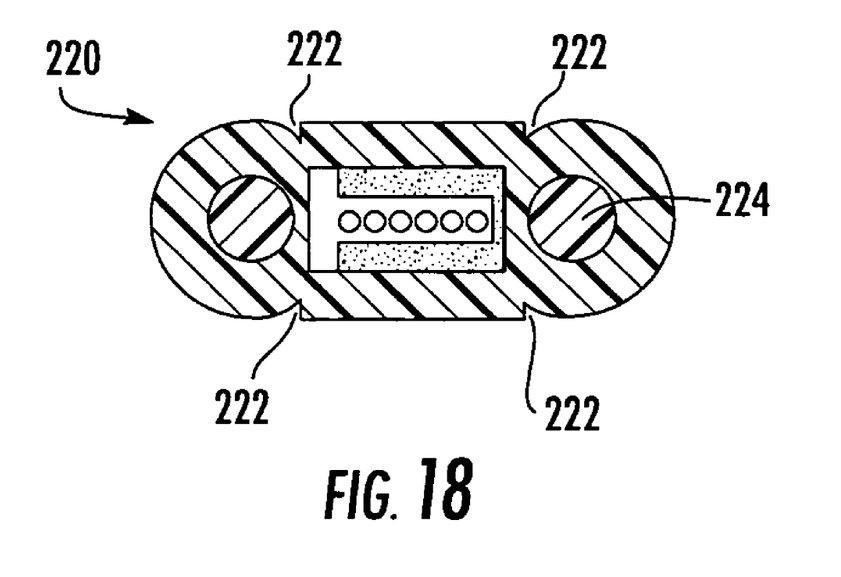

FIGS. 17 and 18 respectively depict cables 210 and 220 that are similar to cable 10, but have different cross-sectional cable shapes. Fiber optic cable 210 depicts a generally dogbone cable cross-section for cable jacket 218 and fiber optic cable 220 illustrates another variation on the cable cross-section. Fiber optic cable 220 has recessed portions 222 so that the craft can separate one or more of strength members 224 along a portion of the cable. Of course, other cross-sectional shapes are possible with the concepts of the invention. While dry insert 14 is illustrated to be present in the fiber optic cables in FIGS. 14-18, any configuration of the dry insert described above could also be used.

Many modifications and other embodiments of the present invention, within the scope of the appended claims, will become apparent to a skilled artisan. For example, the two portions of the dry insert may be connected by a tape that is rounded between the two portions rather than having a fold therein. Additionally, dry inserts of the present invention can be laminated together as shown or applied as individual components. Therefore, it is to be understood that the invention is not limited to the specific embodiments disclosed herein and that modifications and other embodiments may be made within the scope of the appended claims. Although specific terms are employed herein, they are used in a generic and descriptive sense only and not for purposes of limitation. The invention has been described with reference to silica-based optical waveguides, but the inventive concepts of the present invention are applicable to other suitable optical waveguides and/or cable configurations.

That which is claimed is:

1. A fiber optic cable comprising:
   at least one optical waveguide;
   a cable jacket, the cable jacket having a cavity therein, the at least one optical waveguide being at least partially disposed within the cavity; and
   a dry insert, the dry insert being disposed in the cavity and having a first portion and a second portion, the first portion being connected to the second portion and having at least one fold portion therebetween, and the at least one optical fiber being disposed between the first and second portions of the dry insert, thereby coupling the at least one optical waveguide to the cable jacket.

2. The fiber optic cable of claim 1, wherein the first portion generally faces the second portion.

3. The fiber optic cable of claim 1, the at least one optical waveguide being a portion of a fiber optic ribbon.

4. The fiber optic cable of claim 3, the at least one optical waveguide having an excess ribbon length that is about 0.2% or greater.

5. The fiber optic cable of claim 1, the dry insert further comprising an adhesive member, the adhesive member connecting the first portion and the second portion of the dry insert.

6. The fiber optic cable of claim 1, wherein the first portion and the second portion of the dry insert are generally planar.

7. The fiber optic cable of claim 1, wherein dry insert has a generally U-shaped cross sectional configuration.

8. The fiber optic cable of claim 1, wherein the at least one optical waveguide has a coupling force of at least about 0.1625 Newtons per optical waveguide for a thirty-meter length of fiber optic cable.

9. The fiber optic cable of claim 1, wherein the dry insert includes a foam tape.

10. The fiber optic cable of claim 1, wherein the dry insert includes a compressible layer and a water-swellable layer.

11. The fiber optic cable of claim 1, further comprising at least two strength members disposed on opposite sides of the cavity.

12. The fiber optic cable of claim 1, the dry insert having a third portion, the third portion being integral with the first and second portions and connecting the first portion and second portion to one another, wherein a first fold is disposed between the first portion and the third portion and a second fold is disposed between the second portion and third portion.

13. The fiber optic cable of claim 1, wherein the first portion and the second portion of the dry insert are connected to one another intermittently along a longitudinal length of the dry insert.

14. The fiber optic cable of claim 1, the fiber optic cable includes a component having a water-swellable characteristic or a water-blocking characteristic.

15. The fiber optic cable of claim 1, the dry insert including a plurality of microspheres.

16. The fiber optic cable of claim 1, the dry insert including a dimensional fabric.

17. The fiber optic cable of claim 1, the dry insert including a felt substance.

18. The fiber optic cable of claim 1, the dry insert including a matrix material and a plurality of filaments.

19. A fiber optic cable comprising:
    at least one optical waveguide;
    a cable jacket, the cable jacket having a cavity therein, the at least one optical waveguide being at least partially disposed within the cavity; and
    a dry insert, the dry insert being disposed in the cavity and having a first portion disposed adjacent a first cavity wall and a second portion disposed adjacent a second cavity wall that opposes the first cavity wall and the at least one optical fiber disposed between the first and second portions of the dry insert, the first and second portions being connected to one another along at least a portion of the fiber optic cable and having a fold therebetween, wherein the at least one optical waveguide has a coupling force of at least about 0.1625 Newtons per optical waveguide for a thirty-meter length of fiber optic cable.

20. The fiber optic cable of claim 19, the at least one optical waveguide being a portion of a fiber optic ribbon.

21. The fiber optic cable of claim 19, the at least one optical waveguide having an excess ribbon length that is about 0.2% or greater.

22. The fiber optic cable of claim 19, the dry insert further comprising an adhesive member, the adhesive member connecting the first portion and the second portion of the dry insert.

23. The fiber optic cable of claim 19, wherein the first portion generally faces the second portion.

24. The fiber optic cable of claim 19, wherein the first portion and the second portion of the dry insert are generally parallel to one another.

25. The fiber optic cable of claim 19, wherein the dry insert includes a foam tape.

26. The fiber optic cable of claim 19, wherein the dry insert includes a compressible layer and a water-swellable layer.

27. The fiber optic cable of claim 19, further comprising at least two strength members that are disposed on opposite sides of the cavity.

28. The fiber optic cable of claim 19, the dry insert having a third portion, the third portion being integral with the first portion and second portion and connecting the first and second portions to one another, wherein a first fold is disposed between the first portion and the third portion and a second fold is disposed between the second portion and third portion.

29. The fiber optic cable of claim 19, wherein the first portion and the second portion of the dry insert are connected to one another intermittently along a longitudinal length of the dry insert.

30. The fiber optic cable of claim 19, the fiber optic cable includes a component having a water-swellable characteristic or a water-blocking characteristic.

31. The fiber optic cable of claim 19, the dry insert including a plurality of microspheres.

32. The fiber optic cable of claim 19, the dry insert including a dimensional fabric.

33. The fiber optic cable of claim 19, the dry insert including a felt substance.

34. The fiber optic cable of claim 19, the dry insert including a matrix material and a plurality of filaments.

35. A fiber optic cable comprising:

at least one optical fiber ribbon;

a cable jacket, the cable jacket having a cavity therein, the at least one optical fiber ribbon being at least partially disposed within the cavity; and a dry insert, the dry insert being disposed in the cavity and having a first portion and a second portion, the first portion being connected to the second portion and the first and second portions being generally parallel to one another and having at least one fold portion therebetween, and the at least one optical fiber being disposed between the first and second portions of the dry insert, thereby coupling the at least one optical waveguide to the cable jacket, wherein the dry insert includes a compressible layer and a water-swellable layer.

* * * * *